(12) United States Patent
Lowry et al.

(10) Patent No.: US 8,191,036 B2
(45) Date of Patent: May 29, 2012

(54) MECHANISM TO SUPPORT ORPHANED AND PARTIALLY CONFIGURED OBJECTS

(75) Inventors: Lee Edward Lowry, Orem, UT (US); Rajesh Vasudevan, Sandy, UT (US); Brent Thurgood, Spanish Fork, UT (US); Ryan Cox, Provo, UT (US); Zack Grossbart, Cambridge, MA (US); William Street, Orem, UT (US); Volker Gunnar Scheuber-Heinz, Pleasant Grove, UT (US); Stephen R Carter, Spanish Fork, UT (US)

(73) Assignee: Apple Inc., Cupertino, CA (US)

( * ) Notice: Subject to any disclaimer, the term of this patent is extended or adjusted under 35 U.S.C. 154(b) by 1045 days.

(21) Appl. No.: 12/123,035

(22) Filed: May 19, 2008

(65) Prior Publication Data

US 2009/0288062 A1 Nov. 19, 2009

(51) Int. Cl.
*G06F 9/44* (2006.01)
(52) U.S. Cl. .......................... 717/101; 717/120; 717/121
(58) Field of Classification Search .................... None
See application file for complete search history.

(56) References Cited

U.S. PATENT DOCUMENTS

| | | | | |
|---|---|---|---|---|
| 5,481,722 A * | 1/1996 | Skinner | .......................... | 717/122 |
| 5,778,227 A * | 7/1998 | Jordan | ................................. | 1/1 |
| 5,873,097 A * | 2/1999 | Harris et al. | .......................... | 1/1 |
| 6,256,676 B1 * | 7/2001 | Taylor et al. | .................. | 709/246 |
| 6,275,976 B1 * | 8/2001 | Scandura | ...................... | 717/120 |
| 6,298,481 B1 * | 10/2001 | Kosaka et al. | ................ | 717/110 |
| 6,529,948 B1 * | 3/2003 | Bowman-Amuah | .......... | 709/217 |
| 6,658,642 B1 * | 12/2003 | Megiddo et al. | .............. | 717/101 |
| 6,735,772 B1 * | 5/2004 | MacPhail | ...................... | 719/315 |
| 6,742,175 B1 * | 5/2004 | Brassard | ....................... | 717/107 |
| 7,058,943 B2 | 6/2006 | Blais et al. | | |
| 7,069,537 B2 | 6/2006 | Lazarov | | |
| 7,086,009 B2 * | 8/2006 | Resnick et al. | ............... | 715/771 |
| 7,159,452 B2 | 1/2007 | Saito | | |
| 7,272,815 B1 * | 9/2007 | Eldridge et al. | .............. | 717/101 |
| 7,322,025 B2 | 1/2008 | Reddy et al. | | |
| 7,353,494 B2 | 4/2008 | Nielsen et al. | | |
| 7,779,389 B2 * | 8/2010 | Markov et al. | ................ | 717/121 |
| 7,801,990 B2 * | 9/2010 | Anuff et al. | ................... | 709/225 |
| 8,056,056 B2 * | 11/2011 | Eldridge et al. | ............. | 717/121 |
| 8,060,862 B2 * | 11/2011 | Eldridge et al. | ............. | 717/121 |
| 2002/0100017 A1 * | 7/2002 | Grier et al. | .................... | 717/120 |
| 2003/0056026 A1 * | 3/2003 | Anuff et al. | ................... | 709/316 |
| 2003/0131104 A1 * | 7/2003 | Karamanolis et al. | ........ | 709/225 |
| 2003/0195755 A1 * | 10/2003 | Greenstein et al. | ............... | 705/1 |
| 2004/0117760 A1 * | 6/2004 | McFarling | .................... | 717/101 |

(Continued)

OTHER PUBLICATIONS

Steve Holzner, "Eclipse", O'Reilly Media Inc., Apr. 22, 2004, pp. 1-31 of chapter 2.*

(Continued)

*Primary Examiner* — Thuy Dao
*Assistant Examiner* — Samuel Hayim
(74) *Attorney, Agent, or Firm* — Schwegman, Lundberg & Woessner, P.A.

(57) ABSTRACT

Mechanisms to support orphaned and partially configured objects are provided. A project includes a variety of objects. At least one object is designated as an orphaned object. The orphaned object lacks complete configuration details. Other objects of the project depend on the orphaned object and yet the other objects can load and process within the project as if the orphaned object was fully configured and available.

10 Claims, 3 Drawing Sheets

U.S. PATENT DOCUMENTS

| | | | |
|---|---|---|---|
| 2005/0193383 A1* | 9/2005 | Gryko et al. | 717/163 |
| 2006/0101373 A1* | 5/2006 | Bartz et al. | 717/101 |
| 2007/0186188 A1* | 8/2007 | Harris | 715/835 |
| 2009/0064106 A1* | 3/2009 | Webster | 717/120 |
| 2009/0089752 A1* | 4/2009 | Tristram | 717/120 |

OTHER PUBLICATIONS

Jenny Yi-Chun Kuo et al. "ACS: an Addressless Configuration Support for Efficient Partial Reconfigurations", IEEE, 2008, <http://ieeexplore.ieee.org/stamp/stamp.jsp?tp=&arnumber=4762379> pp. 1-8.*

Zhiyuan Li et al. "Configuration Prefetching Techniques for Partial Reconfigurable Coprocessor with Relocation and Defragmentation", ACM, 2002, <http://delivery.acm.org/10.1145/510000/503076/p187-li.pdf> pp. 1-9.*

"Mr Persister", Jenkov ApS, 2005, <http://jenkov.com/mrpersister/index.html> pp. 1-3.*

Herman, Ivan, "Web Ontology Language (OWL)", http://www.w3.org/2004/OWL/, W3C Semantic Web,(2004).

* cited by examiner

MECHANISM TO SUPPORT ORPHANED AND PARTIALLY CONFIGURED OBJECTS

BACKGROUND

Collaborative environments are becoming pervasive in the industry. One area of collaboration that is critical to an enterprise is that which is associated with new software development. During software development a variety of different developers can be working on the same or dependent modules at the same time and in entirely different processing environments. A variety of different project life-cycle and version control systems attempt to coordinate project activities in scenarios such as this.

One issue with traditional software modeling and software development environments is that these techniques force the user to define modules before the modules can be used or manipulated. At first blush, these approaches would seem obvious, but it is a limitation that excludes many valuable non-technical staff (e.g., designers, architects, etc.) from effectively participating in project development projects via automated processes.

In other words, traditional project modeling systems have not been supportive of high-level conceptual work. These systems basically force users to fill in all the details for modules before the modules can be used or even placed in these systems. The end result is that the users of these systems tend to be limited to very technical staff (e.g., developers, administrators, etc.) of enterprises. The module details are usually not known or even a concern of non-technical staff so these systems tend to exclude any effective participation of the non-technical staff in the automated project development.

Essentially, with traditional modeling systems work can be stymied until modules for a project are fully defined within the modeling environment. This also effects technical staff because one developer may be waiting on another developer for a module to be defined before the waiting developer can complete his/her piece of the project.

In still another situation, a technical user may actually know the details for his/her module but for whatever reason may not want to provide the full details for that module. For example, the user may be in a rush or may have unresolved security issues that are legitimate concerns and therefore the user needs to hold off on fully defining the module within the modeling system.

Thus, improved mechanisms are needed for managing modules within a project-based environment.

SUMMARY

In various embodiments, mechanisms to support orphaned and partially configured objects are provided. More specifically, and in an embodiment, a method is provided for managing an orphaned object within a project environment. A definition is received for an object; the definition permits configuration details of the object to be delayed and defined at a subsequent point in time. The object is integrated into a project to which the object is associated when the configuration details are still undefined for the object. Also, other objects of the project are permitted to reference the object and process with dependencies to the object even when the configuration details remain undefined when these other objects process within the project.

DETAILED DESCRIPTION

Figure 1:
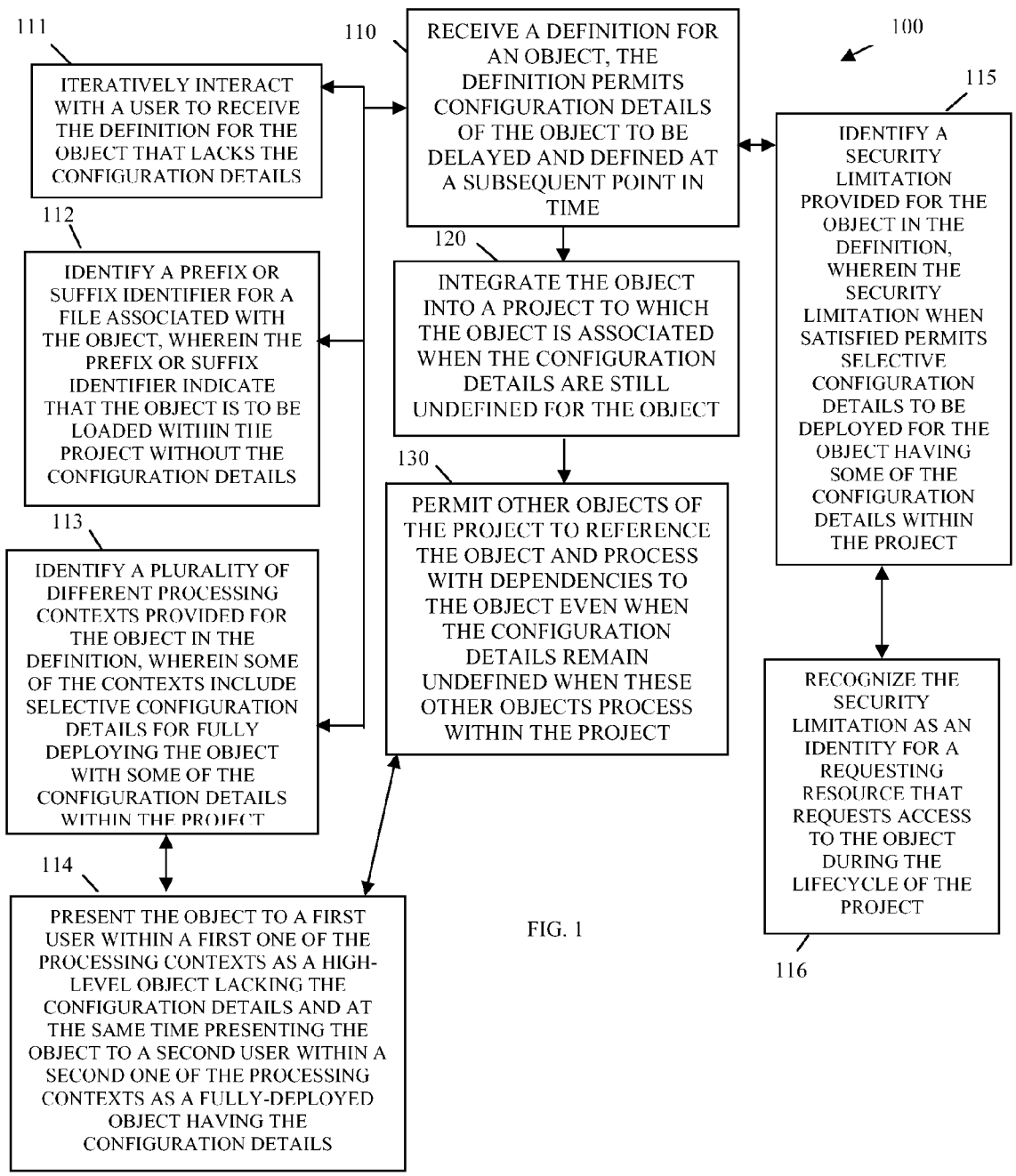
FIG. 1 is a diagram of a method for managing an orphaned object within a project environment, according to an example embodiment.

A "resource" may include a user, content, a processing device, a node, a service, an application, a system, a schema definition, a directory, an operating system (OS), a file system, a data store, a database, a policy definition, a configuration definition, a file, a World-Wide Web (WWW) service, a WWW page, groups of users, combinations of these things, etc. The terms "service," "application," and "system" may be used interchangeably herein and refer to a type of software resource that includes instructions, which when executed by a machine performs operations that change the state of the machine and that may produce output.

A "software module" is a particular type of resource that processes as instructions on a machine, such as a computer. The phrase "software module" and the term "object" may be used interchangeably herein and below. Thus, an object is a set of instructions implemented on a computer-readable storage medium that processes on a computer.

A "project" refers to the activity associated with an enterprise or government producing a good (product) or personal service (e.g., financial advice, etc.) for consumption in the marketplace. The activity for the project is defined in various stages of the project's lifecycle, such as by way of example only project definition, project development, project testing, project release, etc. Thus, a "project" is represented and electronically defined as a series of stages associated with the project's lifecycle. Each stage includes its own processing environment having its own or shared resources. So, a stage is represented and electronically defined as one or more resources and their relationships with other resources of the same stage or a different stage. A project may also be viewed as a type of resource.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. A single processing environment may be logically defined, such that it spans multiple different networks (e.g., multiple different LAN's, a LAN and a wide-area network (WAN), etc.).

A "project processing environment" is a processing environment in which any portion (resource) of a project processes within. So, some portions of a project may process within the project processing environment whereas other potions of the project use different processing environments.

Objects are shared, versioned, and managed via various projects and various processing environments within an enterprise. As will be described more completely herein and below, each object can be integrated and installed for use within a project processing environment even when that object is not fully defined and fully configured. Moreover, this can occur even when there are dependencies on objects that are not fully defined and configured.

Various embodiments of this invention can be implemented in existing network architectures, security systems, data centers, and/or communication devices. Any particular architectural layout or implementation presented herein is provided for purposes of illustration and comprehension only and is not intended to limit aspects or embodiments of the invention.

It is within this context, that various embodiments of the invention are now presented with reference to the FIGS. 1-4.

FIG. 1 is a diagram of a method 100 for managing an orphaned object within a project environment, according to an example embodiment. The method 100 (hereinafter "orphaned object project service") is implemented as instructions in a machine-accessible and readable medium. The instructions when executed by a machine (processor and memory enabled device, such as a computer, etc.) perform the processing depicted in the FIG. 1. The orphaned object project service is also operational over and processes within a network. The network may be wired, wireless, or a combination of wired and wireless.

As will be more fully described herein and below, the orphaned object project service permits a software module represented as an object to be defined, partially and not completely configured, edited, and instantiated on a machine and processed within the context of a project. The orphaned object project service also allows other project objects to process within the project even while the orphaned object continues to lack a complete description or configuration.

At 110, the orphaned object project service receives a definition for an orphaned object. The definition alerts the orphaned object project service to the fact that the object supplied is to be designated an orphaned object because it lacks configuration details. The configuration details are permitted to be received at a subsequent point in time during the lifecycle of a project to which the orphaned object is associated.

Essentially, the definition is a stub or meta container definition for the orphaned object. The orphaned object project service may generate instructions for the stub or meta container that sets environmental values or context. In some cases, methods of the orphaned object may be defined as null pointers, so they exist but have no information.

Conceptually, the orphaned object may be viewed as a top level of a building where the underlying floors are provided via the definition of the orphaned container definition. This permits high-level simulation within the project modeling environment without pre-defining lower level objects or floors of the building.

According to an embodiment, at 111, the orphaned object project service iteratively interacts with a user to receive the definition for the orphaned object, which lacks the configuration details. So, a user can determine how much detail to provide with the orphaned object but at least some details are left out; thus, making the definition associated with an object designated as an orphaned object because not all of its configuration details are supplied, at least initially, by the user. As an example, consider a designer interacting with the orphaned object project service, the orphaned object project service can ask a series of initial questions such as who is the parent of the orphaned object being defined, what library contains the definition for the orphaned object, what container includes the definition for the orphaned object, etc. In response, the designer can simply check a box that indicates the designer is unsure or does not know.

In an embodiment, at 112, the orphaned object project service receives the definition by identifying a prefix or suffix identifier for a file that defines the orphaned object. The prefix or suffix tell the orphaned object project service that the object is to be loaded within the project without the configuration details using the stub or meta container definition. So, the orphaned object project service can iteratively receive the definition for the orphaned object as discussed at 111 or the orphaned object project service can receive the definition during a project load by identifying it as a special type of file to be loaded having a particular predefined prefix or suffix.

In some circumstances, at 113, the orphaned object project service identifies a plurality of different processing contexts provided for the object with the received definition. Some of the contexts include selective configuration details for fully deploying different instances of the orphaned object as a deployed instance. This is done by selectively using some configuration details supplied with the definition or subsequently supplied during the lifecycle of the project. Essentially, the definition for the orphaned object can include linkages to specific contexts. Some of the contexts can be entirely undefined whereas others contexts include details to deploy the orphaned object. Thus, a single generic orphaned object can be plugged in at run time and during the lifecycle of the project to multiple different contexts.

Continuing with the embodiment at 113 and at 114, the orphaned object project service presents the orphaned object to a first user within a first one of the processing contexts as a high-level object lacking the configuration details and yet at the same time the same orphaned object is presented to a second user within a second processing context as a fully deployed object having the necessary configuration details for that second processing context. Thus, the orphaned object can appear as orphaned in one processing context and at the same time appear as fully deployed or deployable in another context.

In an embodiment, at 115, the orphaned object project service identifies a security limitation provided for the orphaned object within the definition. The security limitation when satisfied during the lifecycle of the project permits the orphaned object project service to supply selective configuration details for deploying the orphaned object.

In a variation on the embodiment at 115 and at 116, the orphaned object project service recognizes the security limitation as an identity for a request resource, such as user or automated service, etc. The requesting resource makes a request to access the orphaned object during the lifecycle of the object.

At 120, the orphaned object project service integrates the orphaned object into the project to which it is associated via the definition. This occurs when the configuration details are still undefined for the orphaned object. In some cases as discussed above there may be some configuration details for some contexts supplied but the full configuration details are not supplied (undefined) when the orphaned object is loaded within the project.

At 130, the orphaned object project service permits other objects of the project to reference the object and process with dependencies to the orphaned object even when the configuration details remain undefined when these other objects process within the project. So, other objects that depend or reference the orphaned object can load and process with the stub or container definition of the orphaned object even when the configuration details remain undefined.

The orphaned object project service provides a mechanism for orphaned objects to be utilized even when they remain only partially or completely undefined. So, orphaned project objects don't have to have their parentage predefined within the project module. The orphaned object can be created and operated upon during the lifecycle of the project. In some cases, dependent objects that depend from or make a reference to the orphaned object may not even realize that the orphaned object lacks detail or is just a stub or container.

At any point in time during the lifecycle of the project and when the user is ready to define the proper parentage for an object, the user can do so and in a manner that remains transparent to all other referring objects. This keeps things very clean in a team-enabled and version-controlled project environment because all updates that point to the orphaned object do not get affected or updated in any way and there is no risk of model integrity problems or additional performance problems for having to check in a sleuth of dependent files to reflect a web of relationships.

Figure 2:
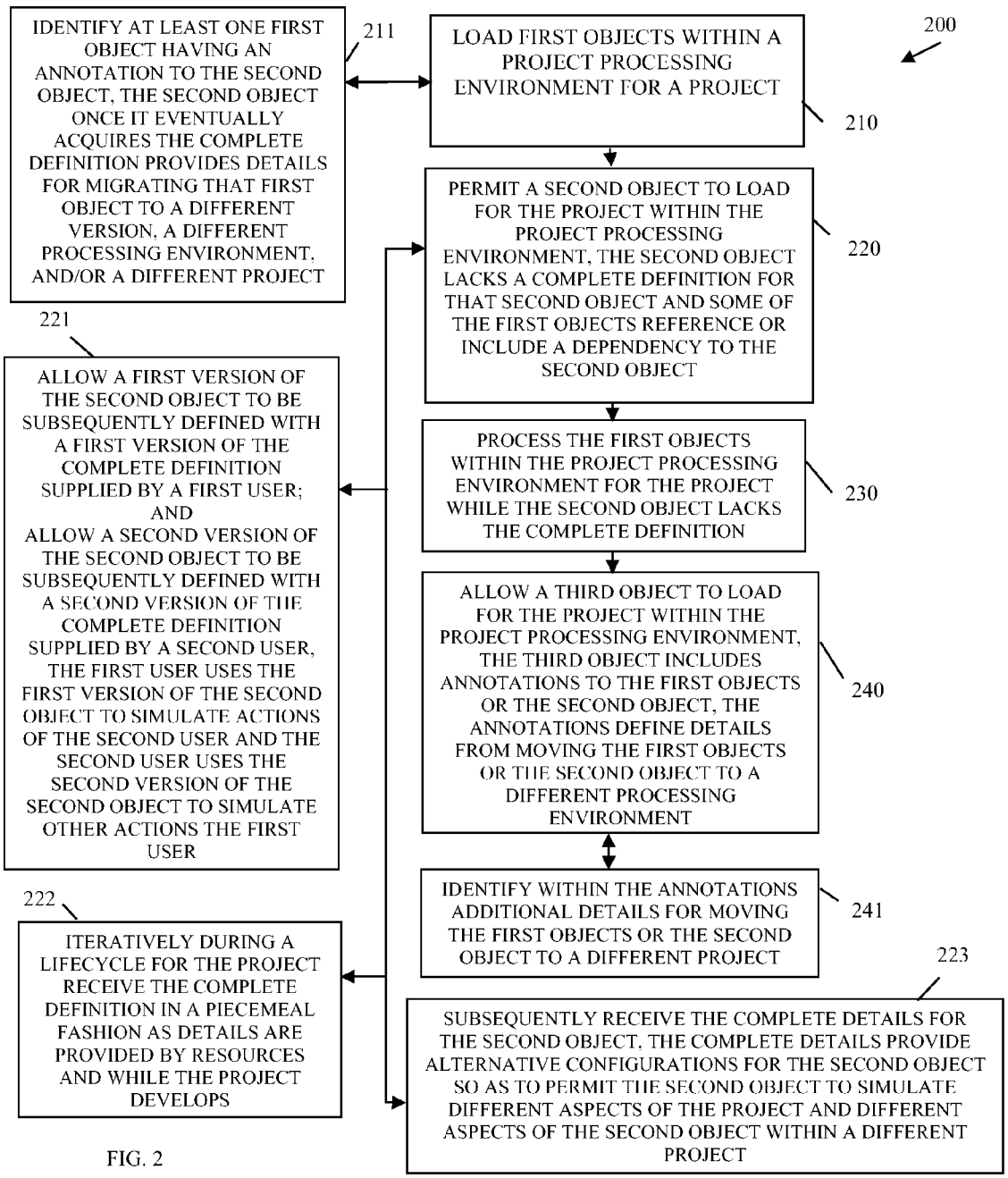
FIG. 2 is a diagram of another method for managing an orphaned object within a project environment, according to an example embodiment.

FIG. 2 is a diagram of another method 200 for managing an orphaned object within a project environment, according to an example embodiment. The method 200 (hereinafter "project management service") is implemented as instructions in a machine-accessible and readable medium. The instructions when executed by a machine perform the processing depicted in the FIG. 2. The project management service is also operational over and processes within a network. The network may be wired, wireless, or a combination of wired and wireless.

The project management service represents another processing perspective to the orphaned object project service represented by the method 100 discussed above with the FIG. 1.

At 210, the project management service loads first objects within a project processing environment for a project. These first objects are fully defined and deployable objects.

In an embodiment, at 211, the project management service identifies at least one first object having an annotation to a second object (discussed below at 220). The second object once it eventually acquires the complete definition provides details for migrating the first object to a different version (perhaps enhanced version) of that first object, for migrating the first object to a different processing environment, and/or for migrating the first object to a different project. Thus, the second object is used to annotate features of the first object once those features are available or become known.

At 220, the project management service permits a second object to load for the project within the project processing environment. The second object lacks a complete definition. Moreover, some of the first objects include a dependency to or reference the second object. So, the project management service loads a second object as an orphaned object that lacks all its configuration details and permits this to occur even when the first objects rely on or reference that second object.

According to an embodiment, at 221, the project management service allows a first version of the second object to be subsequently defined during the lifecycle of the project with a first version of the complete definition. This is done by a first user. The project management service also allows a second version of the second object to be subsequently defined during the lifecycle of the project via a second version of the complete definition. This is done via a second user. The first user can then use the first version of the now deployed second object to simulate actions of the second user, and the second user can use the second version of the second object to simulate actions of the first user. Each user (such as a developer) can continue doing his/her work for the project using the first objects and use his/her own version of the second object simulate actions to which they depend upon from the other user (developer).

In an embodiment, at 222, the project management service iteratively, during the lifecycle of the project, receives the complete definition for the second object in a piecemeal fashion as details are provided by resources (users, automated applications, other objects, etc.). This occurs while the project develops and as stated during the lifecycle of the project.

In another situation, at 223, the project management service subsequently receives the complete details for the second object. The complete details provide alternative configurations for the second object so as to permit the second object to simulate different aspects of the project and/or different aspects of the second object within an entirely different project.

At 230, the project management service processes the first objects within the project processing environment for the project while the second object lacks the complete definition. So, as described in detail above the second object is an orphaned object, within at least some project contexts.

According to an embodiment, at 240, the project management service allows a third object to load for the project within the project processing environment. The third object may be referred to as an annotation object in that it includes annotations to the first object or the second object. The annotations define details for moving the first objects or the second object to an entirely different processing environment.

Continuing with the embodiment at 240 and at 241, the project management service identifies within the annotations details for moving the first objects or the second object to an entirely different project.

So, the embodiments at 240 and 241 demonstrate that an annotation object can include instructions (details) that migrate the first objects or the second object to different processing environments for a same project or to different projects entirely. Thus, the annotation object can provide interoperability for intra and inter project and processing environment capabilities.

Figure 3:
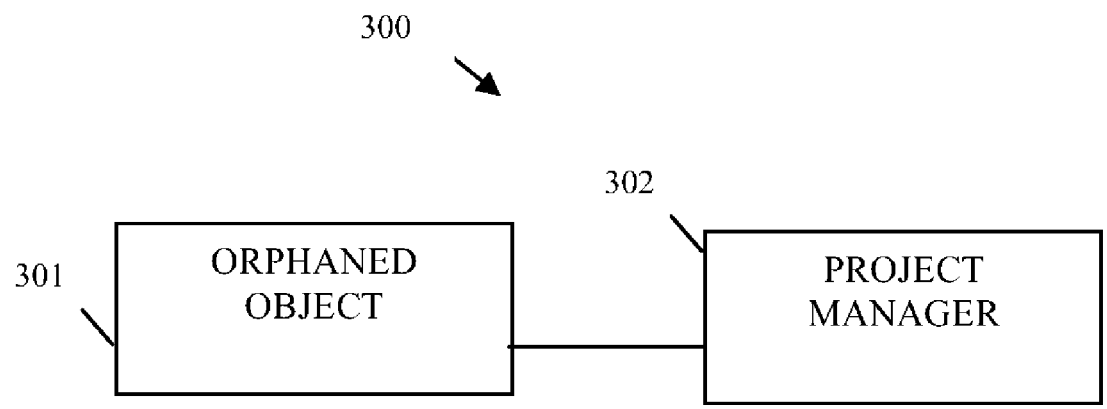
FIG. 3 is a diagram of an orphaned object project management system, according to an example embodiment.

FIG. 3 is a diagram of an orphaned object project management system 300, according to an example embodiment. The orphaned object project management system 300 is implemented as instructions on or within a computer-readable storage medium and a machine-accessible and readable medium. The instructions when executed by a machine (computer, etc.) perform various aspects of the processing depicted with respect to the method 100 of the FIG. 1 and the method 200 of the FIG. 2. The orphaned object project management system 300 is also operational over a network and the network may be wired, wireless, or a combination of wired and wireless.

The orphaned object project management system 300 includes an orphaned object 301 and a project manager 302. Each of these components and their interactions with one another will now be discussed in turn.

The orphaned object 301 is implemented in a machine-accessible and a computer-readable storage readable medium and is to process on a machine within of the network. Some example aspects of the orphaned object 301 were presented above with reference to the methods 100 and 200 of the FIGS. 1 and 2, respectively.

The orphaned object 301 includes a stub definition that just partially defines the orphaned object and that lacks complete configuration details for the orphaned object 301.

In an embodiment, the stub definition includes some complete configuration details for specific processing contexts that become known during the processing of the project (project lifecycle).

The project manager 302 is implemented in a machine-accessible and computer-readable storage medium and is to process on the same machine as the orphaned object 301 or an entirely different machine of the network. Example processing associated with the project manager 302 was presented in detail above with reference to the methods 100 and 200 of the FIGS. 1 and 2, respectively.

The project manager 302 permits the orphaned object 301 to process within a project. That project has second objects that reference or include a dependency to the orphaned object 301. So, the second objects can process within the project even when they reference or depend in some aspects on the orphaned object 301.

In some cases, the stub definition is an annotation to one of the second objects. The annotation once the complete configuration details are subsequently supplied provide instructions for migrating that second object to a different version of the second object, for migrating that second object to a different processing environment, and/or for migrating that second object to a different project. This scenario was discussed in detail above with reference to the method 200 of the FIG. 2.

According to an embodiment, a user or an automated application subsequently supplies the complete configuration details for the orphaned object 301 to replace the stub definition unbeknownst to the second objects and during the lifecycle of the project. Thus, the second objects are not aware that the orphaned object 301 lack configuration details and when those details become available they can be defined and immediately used by the second objects. In fact, the second objects can be completely unaware of the lack of complete configuration details possessed by the orphaned object 301 while those second objects continue to process within the project.

In another case, the second objects use the orphaned object 301 via the stub definition to define their place within a hierarchy of dependencies for the project. The second objects process within the project even without the complete configuration details being known for the hierarchy.

Figure 4:
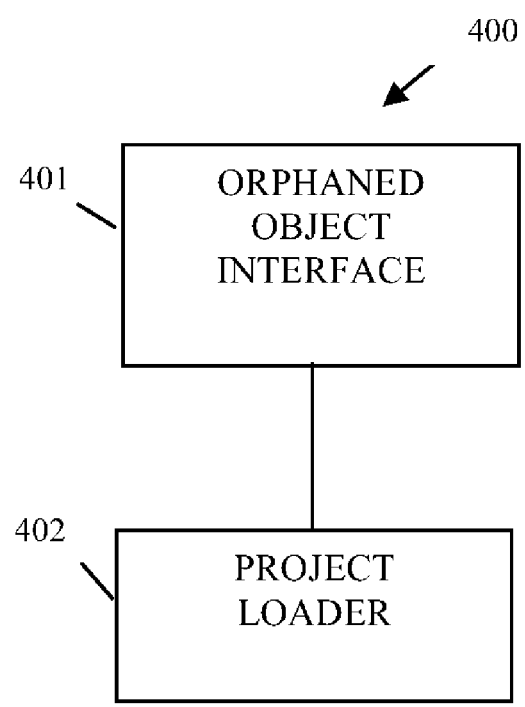
FIG. 4 is a diagram of another orphaned object project management system, according to an example embodiment.

FIG. 4 is a diagram of another orphaned object project management system 400, according to an example embodiment. The orphaned object project management system 400 is implemented as instructions on or within a machine-accessible and computer-readable storage medium. The instructions when executed by a machine (such as a computer) perform various aspects of the processing depicted with respect to the methods 100 and 200 of the FIGS. 1 and 2, respectively, and processing associated with the system 300 of the FIG. 3. The orphaned object project management system 400 is also operational over a network and the network may be wired, wireless, or a combination of wired and wireless.

The orphaned object project management system 400 includes an orphaned object interface 401 and a project loader 402. Each of these components and their interactions with one another will now be discussed in turn.

The orphaned object interface 401 is implemented in a machine-accessible and computer-readable storage medium and is to process on a machine within the network.

The orphaned object interface 401 is used to interactively acquire an orphaned object from a user. The orphaned object lacks a complete configuration and the orphaned object interface 401 associates the orphaned object with a project. So, the user defines a placeholder object missing configuration details via the orphaned object interface 401. This is useful for non-technical staff, such as designers, architects, etc.

According to an embodiment, the orphaned object interface 401 acquires the orphaned object as a container object that provides a context within the project for other object of the project when those other objects process within the project.

In another situation, the orphaned object interface 401 permits the user to provide multiple contexts for the orphaned object and alternative configurations for each context. Examples of this were provided in detail above with reference to the method 200 of the FIG. 2.

In still another case, the orphaned object interface 401 permits the user to supply the orphaned object as an annotation. The annotation is instructions for migrating one or more of the other project resources to different versions, different processing environments, and/or different projects. Again, example details associated with this scenario was provided in detail above with reference to the method 200 of the FIG. 2.

The project loader 402 is implemented in a machine-accessible and computer-readable storage medium and is to process on the same machine as the orphaned object interface 401 or an entirely different machine of the network. Example processing associated with the project loader was described in various aspects above with reference to the methods 100 and 200 of the FIGS. 1 and 2, respectively, and with respect to the system 300 of the FIG. 3.

The project loader 402 acquires the orphaned object along with other objects for the project and loads them for processing even when the other objects reference or include a dependency to the orphaned object.

According to an embodiment, the project loader 402 detects via an event raised from the orphaned object interface 401 when the user has subsequently supplied the complete configuration for the orphaned object. Further, the project loader 402 dynamically configures the orphaned object within the project while the other objects continue to process.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine implemented method residing as executable instructions in a non-transitory computer-readable storage medium for execution on a processor, comprising:

receiving, by the processor, a definition for an object, the definition permits configuration details of the object to be delayed and defined at a subsequent point in time, identifying a plurality of different processing contexts provided for the object in the definition, wherein some of the contexts include selective configuration details for fully deploying the object with some of the configuration details within a project and presenting the object to a first user within a first one of the processing contexts as a high-level object lacking the configuration details and at the same time presenting the object to a second user within a second one of the processing contexts as a fully-deployed object having the configuration details;

integrating, by the processor, the object into the project to which the object is associated when the configuration details are still undefined for the object; and permitting, by the processor, other objects of the project to reference the object and process with dependencies to the object even when the configuration details remain undefined when these other objects process within the project.

2. The method of claim 1, wherein receiving further includes iteratively interacting, via the processor, with a particular user to receive the definition for the object that lacks the configuration details.

3. The method of claim 1, wherein receiving further includes identifying a security limitation provided for the object in the definition, wherein the security limitation when satisfied permits selective configuration details to be deployed for the object having some of the configuration details within the project.

4. The method of claim 3, wherein identifying further includes recognizing the security limitation as an identity for a requesting resource that requests access to the object during the lifecycle of the project.

5. A machine implemented method residing as executable instructions in a non-transitory computer-readable storage medium for execution on a processor, comprising:

loading, by the processor, first objects within a project processing environment for a project;

permitting, by the processor, a second object to load for the project within the project processing environment, wherein the second object lacks a complete definition for that second object and wherein some of the first objects reference or include a dependency to the second object, allowing a first version of the second object to be subsequently defined with a first version of the complete definition supplied by a first user and allowing a second version of the second object to be subsequently defined with a second version of the complete definition supplied by a second user, wherein the first user uses the first version of the second object to simulate actions of some of the first objects as the first user believes the second user is going to use those first objects, and wherein the second user uses the second version of the second object to simulate other actions of other first objects as the second user believes the first user is going to use those other first objects; and processing, by the processor, the first objects within the project processing environment for the project while the second object lacks the complete definition.

6. The method of claim 5 further comprising, allowing, by the processor, a third object to load for the project within the project processing environment, wherein the third object includes annotations to the first objects or the second object, the annotations define details for moving the first objects or the second object to a different processing environment.

7. The method of claim 6, wherein allowing further includes identifying within the annotations additional details for moving the first objects or the second object to a different project.

8. The method of claim 5, wherein loading further includes identifying at least one first object having an annotation to the second object, wherein the second object once it eventually acquires the complete definition provides details for migrating that first object to a different version, a different processing environment, and/or a different project.

9. The method of claim 5, wherein permitting further includes iteratively during a lifecycle for the project receiving the complete definition in a piecemeal fashion as details are provided by resources and while the project develops.

10. The method of claim 5, wherein permitting further includes subsequently receiving the complete details for the second object, wherein the complete details provide alternative configurations for the second object so as to permit the second object to simulate different aspects of the project and different aspects of the second object within a different project.

* * * * *